(12) United States Patent
Dukhovny

(10) Patent No.: US 9,413,600 B2
(45) Date of Patent: Aug. 9, 2016

(54) METHOD FOR MANAGING E-TREE SERVICES IN MPLS NETWORKS

(75) Inventor: Vadim Dukhovny, Petach Tikva (IL)

(73) Assignee: ECI Telecom Ltd., Petach Tikva (IL)

( * ) Notice: Subject to any disclaimer, the term of this patent is extended or adjusted under 35 U.S.C. 154(b) by 536 days.

(21) Appl. No.: 13/605,147

(22) Filed: Sep. 6, 2012

(65) Prior Publication Data

US 2013/0058257 A1    Mar. 7, 2013

(30) Foreign Application Priority Data

Sep. 6, 2011    (IL) .......................................... 215009

(51) Int. Cl.
*H04L 12/24* (2006.01)
*H04L 12/753* (2013.01)
*H04L 12/723* (2013.01)

(52) U.S. Cl.
CPC ............ *H04L 41/0803* (2013.01); *H04L 45/48* (2013.01); *H04L 45/50* (2013.01)

(58) Field of Classification Search
CPC ......... H04L 45/02; H04L 45/04; H04L 45/16; H04L 45/18; H04L 45/48; H04L 45/50
See application file for complete search history.

(56) References Cited

U.S. PATENT DOCUMENTS

| | | | |
|---|---|---|---|
| 6,556,541 B1 * | 4/2003 | Bare | 370/235 |
| 2003/0012189 A1 | 1/2003 | Nomura | |
| 2003/0037162 A1 * | 2/2003 | Kotser | 709/236 |
| 2004/0037279 A1 * | 2/2004 | Zelig et al. | 370/390 |
| 2004/0133619 A1 * | 7/2004 | Zelig et al. | 709/200 |
| 2006/0109802 A1 * | 5/2006 | Zelig et al. | 370/258 |
| 2006/0245436 A1 * | 11/2006 | Sajassi | 370/395.53 |
| 2009/0059800 A1 * | 3/2009 | Mohan | 370/241.1 |
| 2009/0073989 A1 * | 3/2009 | Cai et al. | 370/395.53 |
| 2011/0164617 A1 | 7/2011 | Yong | |
| 2012/0250695 A1 * | 10/2012 | Jia et al. | 370/400 |

* cited by examiner

*Primary Examiner* — Luat Phung
*Assistant Examiner* — Saad A Waqas
(74) *Attorney, Agent, or Firm* — Browdy and Neimark, PLLC

(57) ABSTRACT

A method and device for managing E-tree services in an MPLS network having domains comprising network nodes and links, wherein the network is adapted to accommodate an E-tree structure formed by the network nodes for a specific E-tree service. The E-tree structure comprises a root point communicating with a number of leaf points, so that any network node of the E-tree structure is connected via its ports to links leading to a root point and/or a leaf point of said structure. The method comprises: marking ports of a specific node associated with links leading only to leaf points of the structure while marking differently ports of a specific node, associated with links leading to the root point; marking ports of a specific node connected to incoming or outgoing links of the same domain, and ensuring that traffic will not be returned thereby creating network loops.

9 Claims, 2 Drawing Sheets

METHOD FOR MANAGING E-TREE SERVICES IN MPLS NETWORKS

FIELD OF THE INVENTION

The present invention relates to a technology for managing E-tree services in MPLS telecommunication networks, for example for preventing loops and preventing communication between leaves in H-VPLS type of MPLS networks.

BACKGROUND OF THE INVENTION

To prevent undesired traffic (and specifically, traffic loops) in MPLS networks comprising E-tree structures for serving specific traffic flows/services, a so-called "Split Horizon" (SH) rule has been formulated in the prior art.

An MPLS network may comprise one or more geographical, technological and/or administrative network domains.

An E-tree structure in a communication network section may be established on one or more network domains for a specific traffic service, the E-tree being characterized in that it comprises at least one root node (say, a central office of a bank), which may be connected to two or more leaf nodes (branches of the bank) directly or via other transit nodes in the network. If the bank central office has a protection server, the server may have another geographic location and will form a second root of the E-tree.

It can be mentioned that E-Tree is a standard name for point-to-multipoint (P2MP) traffic services.

The SH rule states that the root may be in bidirectional communication with any of the leaves in the E-tree structure, while leaves of the E-tree cannot be in communication with one another. Following these rules actually allows preventing main causes for traffic loops in any E-three structure.

In other words, for E-tree services, communication between leaves is not allowed, while communication between each of the roots and all leaves of the structure is required.

Prior art comprises various studies of the problem, and attempts to practically implement the SH rule to prevent traffic loops and communication between leaves in communication networks.

For example, the work of Simon Delord et al. "MEF E-tree service over MPLS. Needs, Myths and Challenges" from a site called http://www.ethernetacademy.net/ discusses the SH rule, saying that on E-tree each endpoint is designated as either a root or a leaf. Root can communicate with all other endpoints on the E-tree, however leaf can only communicate with roots but not leafs. However, the article does not comprise practical recommendations how to implement the rule in the network.

US2007177661A describes a method for detecting a network loop problem in a network, which includes: selecting a known static address of a selected device which should normally be detected at not more than one port of a downstream device; determining if the static address is detected in more than one port in a downstream device, wherein the current downstream device includes a first port which normally detects the known static address and a second port; if the static address is detected at the second port of the current downstream device, then determining the connection to the second port and if the connection to the second port is a leaf, then identifying the leaf as a misbehaving node, and if the connection to the second port is not a leaf, then evaluating a next downstream device.

Prior art also comprises a concept (previously presented by the Applicant) for marking different domains of a communication network with different categories/marks for preventing loops there-between. US2010080239A describes a technology for combating loops in multi-domain networks, by assigning to network domains categories, at least such as "high/trusted" and "low/less trusted", and by making a decision about relearning Forwarding Information Base FIB of any edge node interconnecting different network domains, utilizing the assigned categories.

Those skilled in the art know that in complex communication networks which form a mesh and comprise a number of network domains, the task of preventing loops is quite complex and painstaking.

Modern MPLS networks, such as VPLS (virtual private LAN service) are mesh networks which usually support E-tree services. Any MPLS network, for example a Hierarchical VPLS network may comprise/serve multiple E-tree services which usually utilize/cover overlapping portions of the network.

To the best of the Applicant's knowledge, no simple, user-friendly, automatic measures have been proposed for E-tree services in VPLS and HVPLS networks by now, to facilitate prevention of traffic loops.

OBJECT AND SUMMARY OF THE INVENTION

It is an object of the invention to provide a simple and effective method for managing traffic of E-tree services within MPLS network domains.

Let us consider that a communication network comprises one or more interconnected network domains which are geographically, technologically and/or administratively different. Network elements in such network domains may be interconnected in various manners, for example may form a full mesh network. Each specific E-tree service structure is preliminarily selected (assigned) over the network domains and comprises assigned MPLS tunnels/links/pseudowires (PW) interconnecting assigned network nodes so as to connect leaf points of the structure with one or more root points of the structure. It should be noted that a network node may be connected to a root point, to one or more leaf points, and to a leaf point(s) and a root point(s) simultaneously.

(Direct connections from nodes to root points and/or leaf points will be called links but they usually do not form part of the MPLS network; for example, they may be links of a provider bridge (PB) network).

According to a first aspect of the invention, there is proposed a method for managing E-tree services in an MPLS network with topology comprising one or more domains of network nodes and links, the network accommodating an E-tree structure formed from the network nodes for a specific E-tree service, wherein the E-tree structure comprises at least one root point communicating with a number of leaf points, so that any network node of the E-tree structure is connected via its ports to one or more links leading directly or indirectly to a root point and/or a leaf point of said structure,
the method comprises
  selecting at least two following kinds of indications (i.e., Split Horizon Groups SHGs, for example in the form of numbers, names, etc.):
    a special indication (a special SHG, for example "7") one or more regular indications (or regular SHGs, for example "1", "2", etc.):
    based on the topology of the network, marking ports of the network nodes of the E-tree structure by using said at least two kinds of indications as follows:
    a) marking ports of a specific node, associated with links leading directly or indirectly to leaf points only, with said special indication (say, "7");

b) marking ports of a specific node, associated with links leading directly or indirectly to a root point, with one of the regular indications (say, "1");

c) marking ports of a specific node, connected to links incoming from or outgoing to (belonging to) one and the same domain, with one and the same regular indication (say, 1 which was already used) and associating said regular indication with said domain;

d) ensuring that in case the same said specific node is a border node between different bordering domains, the regular indication associated with one of the different bordering domains (say, "1") is not equal to the regular indication (say, "2") associated with another of the different bordering domains;

the method further comprises e) prohibiting to forward traffic/data, via said specific network element, between ports having equal indications while allowing to forward data between ports having different indications.

In practice, upon performing the marking, the method further comprises deploying the E-tree service onto the suitable E-tree structure in the MPLS network and forwarding traffic of the E-tree service in the network and within the network nodes according to the performed marking.

The term "managing of E-tree service" should be understood to comprise prevention of loops and preventing communication between leaves".

Links mentioned above may be understood as physical connections or as tunnels (for example, pseudo wires PWs of the discussed E-tree service in MPLS network). Most of the links belong to the MPLS network. However, some of the links may belong to an external network (for example a provider bridge PB network) and may connect network nodes with a root point and/or leaf points.

For a specific E-tree service, a network element's port connected to an MPLS domain is associated with a specific pseudo wire (PW). A different E-tree service existing in the network may use the same port of a network element, but that different E-tree service will use a different PW, so the port for that different E-tree service may be marked differently. Each specific E-tree service in the MPLS network may undergo the described method separately. All the marks assigned to ports of the network elements (as discussed above) are selected and assigned for a specific E-tree service and do not apply to another E-tree service. Each port may therefore have different marks associated with different E-tree services using it.

As noted before, some ports of the network nodes may be directly connected to end points (root, leaf) of the E-three structure. Such connections/links leading directly to leaf points or root points may be not considered as MPLS links and must not belong to any MPLS domain. However, they are marked according to the method, and in case that at one node one connection leads to a root and another connection to a leaf, their ports should still have different indications.

The marking is preferably performed automatically, by a Network Management Entity NME, for example by a network management system (NMS).

While selection of the indications for the marking, and the marking itself is controlled by the NMS after which the information is downloaded to the nodes, the step of "prohibiting" is controlled by each node itself during forwarding traffic of each specific E-tree service between the ports.

The method may comprise the following additional steps:

marking the ports which are directly connected to root points, with an additional special indication (say, "0"), and allowing traffic between the ports marked with such a special indication. This indication may also be of help in finding a simple solution to allow communication between a root and a leaf if they are connected to one and the same network element (node).

The above method allows easily selecting the indications, marking the ports with the selected indications in the NMS, downloading information about the marking to the nodes; the split horizon rule "to prevent communication between leafs" is thereby satisfied.

Moreover, the proposed marking automatically prevents returning traffic, to the same link from which it has arrived to the network node—thereby preventing the common occurrence of traffic loops in the network.

In communication networks where the number of domains is quite high, the number of indications utilized for the multi-domain network may be more than two.

The proposed method allows simply and effectively performing the E-tree service maintenance, namely adding an additional leaf/root point, removing a leaf/root point, changing place of a leaf/root, etc.

To facilitate the automatic character of the method, the method may comprise selecting the regular indications as natural numbers, by using an incrementing counter (1, 2, . . . ) for creating the regular indications, while provided that the special indications are excluded from said numbers.

The method is especially effective for multi-domain MPLS networks, such as H-VPLS networks.

According to a second aspect of the invention, there is provided a Network Management Entity (NME, or NMS) suitable for managing E-tree services in an MPLS network comprising nodes, the NME comprising respective functional blocks for:

storing topology data of the network in the NME, the topology comprising information about at least one E-tree structure for E-tree service;

performing processing of the topology data, based on the processed topology data, selecting at least two types of indications, namely one special indication and one or more regular indications;

assigning said at least two types of indications to ports of the nodes for marking said ports, as follows:

based on the topology of the network, marking ports of the network nodes of the E-tree structure by using said at least two kinds of indications as follows:

a) marking ports of a specific node, associated with links leading directly or indirectly only to leaf points of the structure, with said special indication;

b) marking ports of a specific node, associated with links leading directly or indirectly to the root point, with one of the regular indications;

c) marking ports of a specific node, connected to links incoming from or outgoing to one and the same domain, with one and the same regular indication and associating said regular indication with said domain;

d) ensuring that in case the same said specific node is a border node between different bordering domains, the regular indication associated with one of the different bordering domains is not equal to the regular indication associated with another of the different bordering domains;

downloading the performed marking, thereby commanding to the nodes to mark their ports with the selected indications and enabling the nodes to pass traffic of the E-tree service there-through so as to prohibit forwarding the traffic between ports having equal indications while to forward the traffic between ports having different indications.

According to a third aspect of the invention, there is also provided a software product (preferably residing at NME of the network), the product comprising data and/or computer implementable instructions for carrying out the described method, stored on an appropriate computer readable storage medium so that the software is capable of enabling operations of said method when used in a computer system. The computer system may comprise the NME and control units of network nodes of the network.

BRIEF DESCRIPTION OF THE DRAWINGS

The above invention will be further described and illustrated with the aid of the following non-limiting drawings in which.

DETAILED DESCRIPTION OF PREFERRED EMBODIMENTS

Figure 1:
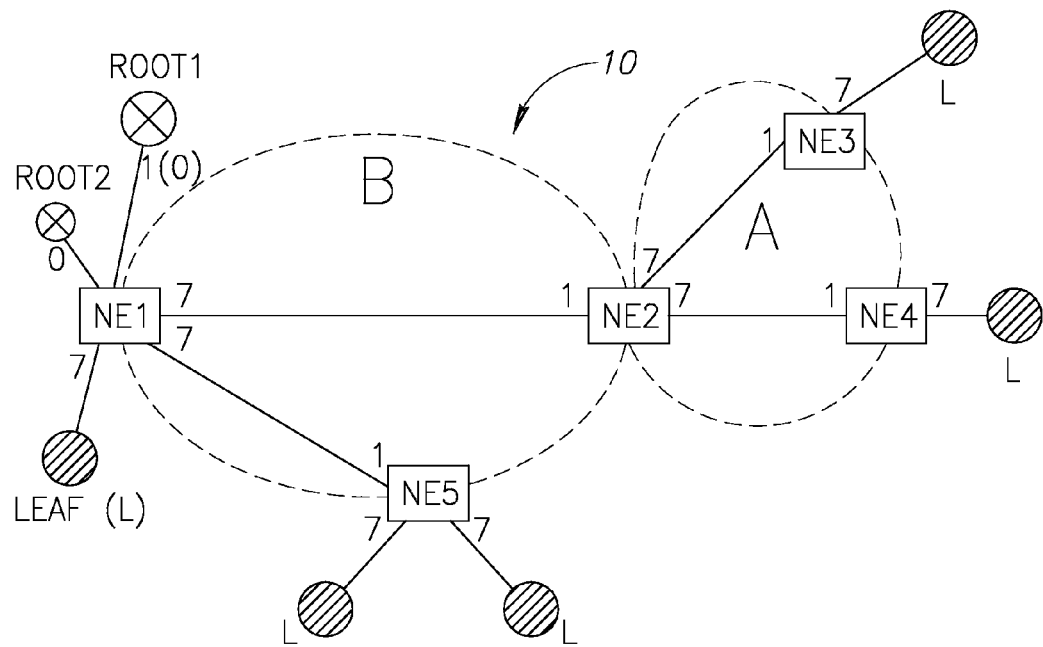
FIG. 1 is a schematic block-diagram of a multi-domain MPLS network where the proposed method can be applied for an E-tree service, with schematic indications of the selected and performed network mapping, to prevent traffic loops in the E-tree structure of the service.

FIG. 1—illustrates schematically how the proposed method can be applied to an exemplary simplified multi-domain MPLS network 10.

We hereby present results of some steps implemented by a software product which is allocated in a network management system (NMS) of the exemplary network 10 comprising two network domains A and B (say, VPLS domains). Leaf points are shown as hatched rings (suppose they are branches of a bank), root points are shown as crossed rings (say, they are two mutually protected locations of a central office of the bank); the leaf points are located beyond the network domains. Leaves are marked by L or "leaf", and root points are marked as R or "root".

In the proposed example we will manage with two types of indications (SHGs) in the form of numbers; the special indication is "7" and the regular indication is 1. In case we have one root, we may use "1" for any link leading to the root. In case we have two roots at the same node (NE1), we will indicate their links by the additional special indication "0". Communication between two "0"s is allowed (we keep in mind that communication between two regular indications "1" would be prohibited).

The method comprises a number of conditions and requirements.

For E-Tree service, NMS should allocate SHGs (split horizon groups indications) on pseudo wires (PWs) leading towards the network according to the described below rules. This should be performed both for H-VPLS enabled (multi-domain) and H-VPLS disabled networks (one-domain networks).

Note: for H-VPLS disabled networks\, NMS may use only two values for SHG indications, for example:

Indication "1" on ports/PWs leading towards network elements NEs with root, i.e., connected directly or indirectly with at least one root, and Indication "7" on ports/PWs leading towards NEs with no root—i.e., connected directly or indirectly to only leaves.

An additional indication (which is actually not an SHG indication) such as "0" may be used for marking root connections.

Specific Requirements:

Req#A: When allocating PW SHGs, NMS should allocate SHG indication=7 on PWs leading (directly or transit) to NEs which include only leaves, in order to prevent traffic between remote and local leaves.

Req#B: Within the same domain, ports of all PWs of a NE (i.e., PWs of both directions—leading from/to the same NE) should have the same SHG indications. This rule/requirement has a local meaning, i.e. relates to a specific NE and the same specific domain.

Req. #C: When editing an existing service, any new PW outgoing from/input to the same existing NE within the same network domain, should obtain the SHG indication equal to the existing SHG indications at this specific NE for this specific domain.

Req#D: When allocating SHGs indications on PWs, NMS should NOT allocate SHG=7 on PWs leading (directly or transit) to NEs which include at least one root—in order to enable traffic between remote root(s) and local leaves. This requirement logically complements the Req#A.

Figure 2:
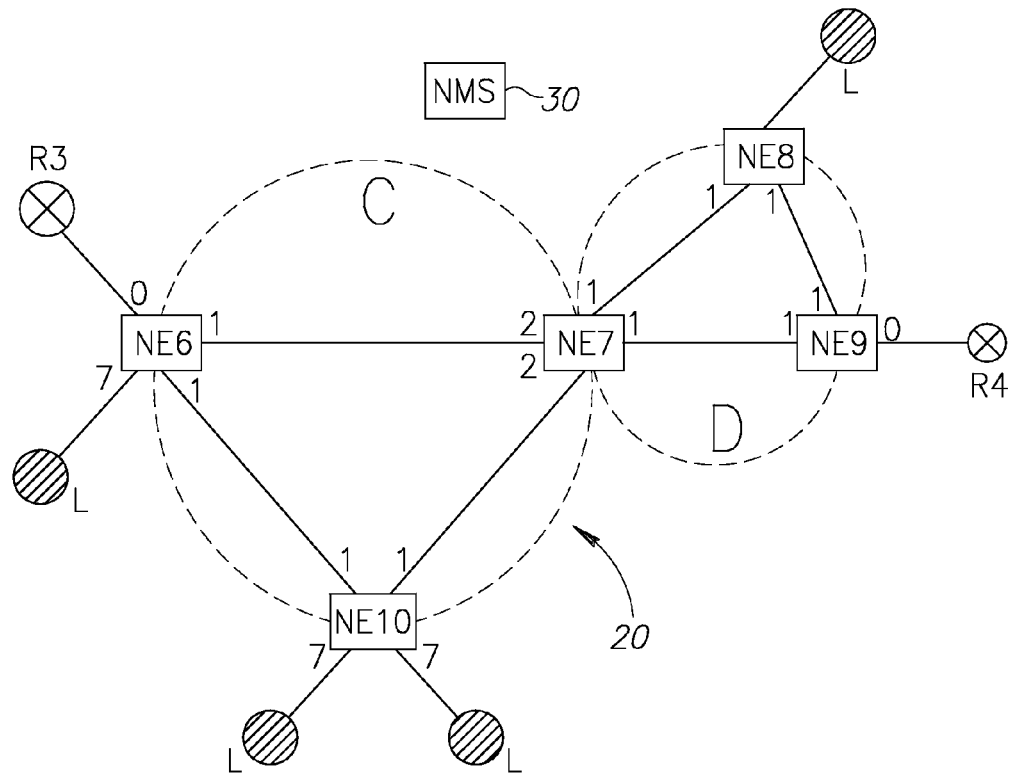
FIG. 2 is a schematic illustration of a multi-domain MPLS network, for example a Hierarchical VPLS network (HV-PLS), where more than two indications are utilized for the proposed marking.

FIG. 2 illustrates how the proposed method may be implemented in another multi-domain, H-VPLS enabled network 20 having domains C and D. The network is managed by NMS 30 which may perform at least part of operations of the proposed method. Network 20 accommodates an E-tree structure with two root points (Root 3 and Root 4) and a number of leaf points (leaves are shown by hatched circles). The E-tree structure is used for providing the customers located at the leaf points with E-tree service from two root points. As will be seen, more than two indications (SHGs) are required for such a network.

In the example proposed in FIG. 1, the indications (SHGs) "1" and "7" ("7" being the special one) were used for marking the network 10. For the network 20 shown in FIG. 2, there will be an additional obvious requirement:

while mapping the SHG indications in each further domain of the network, the NMS will try selecting new regular indications (SHGs) that do not conflict with the previously used ones. For example, for new regular SHGs, the NMS may utilize natural numbers generated by its internal counter in the natural order.

For example, for mapping ports of a border node NE7 belonging to the domain C in the network 20, NMS has selected SHG indications "2", while the same border node NE7 has ports belonging to another domain D, and these ports are marked with "1".

It should be kept in mind that when the number of domains grows (usually, if the network comprises more than 6 domains), the NMS should skip the SHG indication "7" since it was preliminarily selected as a special SHG indication. In other words, the NMS will jump from SHG=6 to SHG=8 (if supported in the equipment).

If an additional leaf is to be added to an E-tree service, the procedure of marking according to the proposed method can be performed based on the new topology and will not cause problems, since in most cases the only change will be to mark an additional port with the indication already accepted for the specific node, domain and E-tree service. However, even adding/removing a new root will not require changes in the whole network, but only recalculation with respect to the specific E-tree service.

Figure 3:
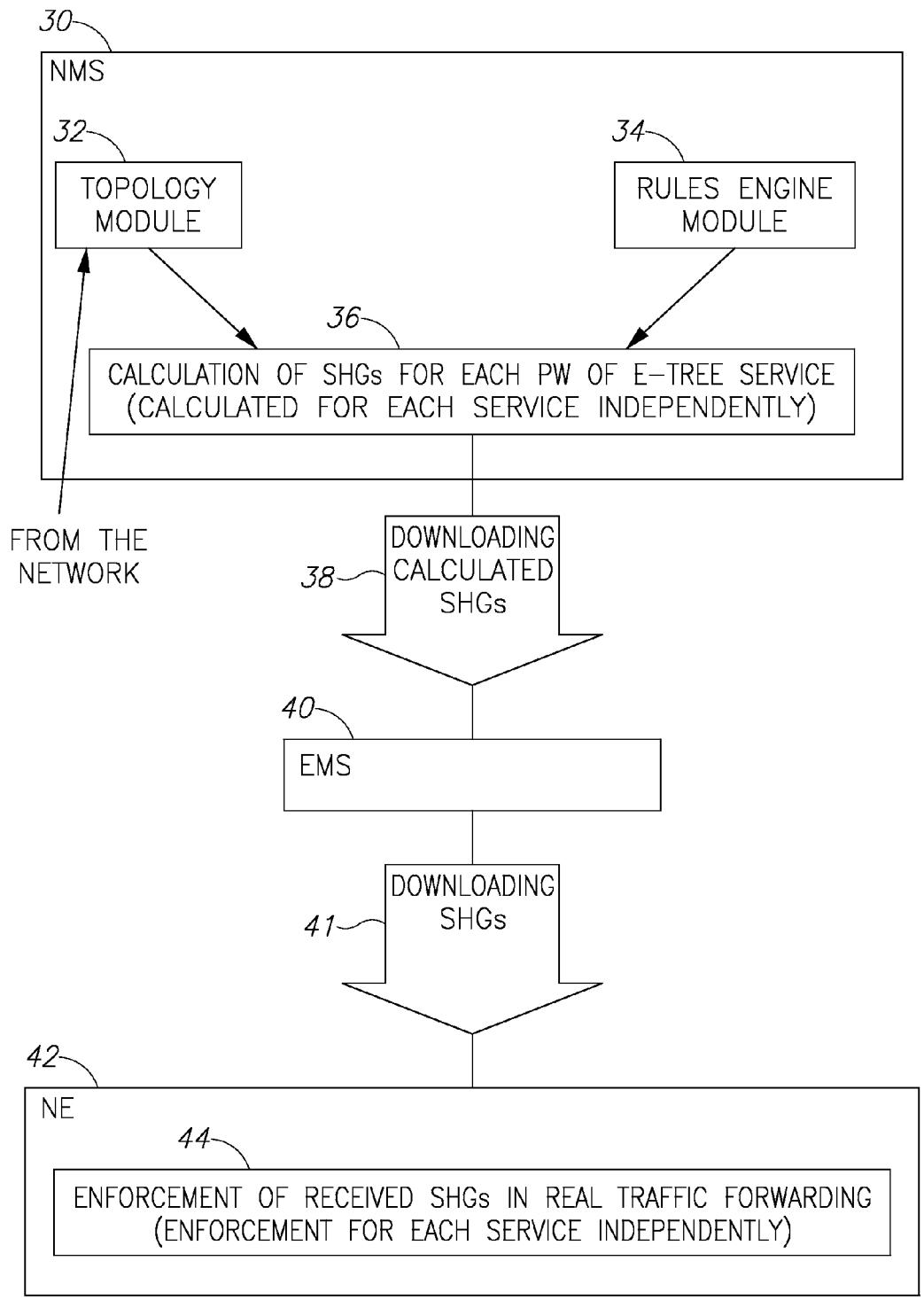
FIG. 3 is a schematic block-diagram of one proposed embodiment of a Network Management System (NMS) of an MPLS network, adapted to calculate SHG indications of ports/pseudo wires (PW) for nodes that support various E-tree services.

FIG. 3 illustrates a simplified block-diagram schematically showing how NMS 30 performs calculation of SHG indications in order to mark ports of MPLS nodes/network elements NE. A port may be associated with one or more pseudo wires PW which may respectively belong to one or more E-tree services. Topology information obtained directly or indirectly from an MPLS network (not shown) is stored in the topology module 32 of the NMS. Based on information obtained from the module 32, and using rules provided by a rules engine module 34 of the NMS, a processing block 36 of the NMS performs calculations of SHG indications, for marking nodes of the network. It should be kept in mind that for each E-tree service the calculation is performed separately, and that one and the same port may participate in different E-tree services. Therefore, each port may obtain different SHG indications associated with different pseudo wires belonging to different E-tree services. The calculated indications may be downloaded (block 38) from NMS 30 to one or more Element Management Systems (an exemplary EMS 40 is shown); the EMS then downloads (block 41) relevant SHG indications to each specific network element NE, thus accomplishing the "marking" operation of its ports (NE 42 is shown without ports being marked). Embedded logic 44 of the node 42 further implements the received SHG indications for forwarding real traffic flows of different E-tree services by the node.

It should be appreciated that other versions of the method, and different implementations of NMS and/or other management entities controlling the method may be proposed, and that they should be considered part of the invention whenever defined by the general claims which follow.

The invention claimed is:

1. A method for managing E-tree services in an MPLS network with topology comprising one or more domains of network nodes and links, the network is adapted to accommodate an E-tree structure formed by the network nodes for a specific E-tree service, wherein the E-tree structure comprises at least one root point communicating with a number of leaf points, so that any network node of the E-tree structure is connected via its ports to one or more links leading directly or indirectly to a root point and/or a leaf point of said structure, the method comprises:
  selecting indications of at least the following types: one or more regular Split Horizon Group (SHG) indications, and one special SHG indication, one additional special non-SHG indication;
  based on the topology of the network and the specific E-tree service, marking ports of the network nodes of the E-tree structure by using all of said indications as follows: a) marking ports of a specific node, associated with links leading directly or indirectly only to leaf points of the structure, with said special SHG indication;
  b) marking ports of a specific node, associated with links leading directly or indirectly to the root point, with one of the regular SHG indications;
  c) marking ports of a specific node, connected to links incoming from or outgoing to one and the same domain, with one and the same regular SHG indication and associating said regular SHG indication with said domain, wherein, in case the same said specific node is a border node between different bordering domains, the regular SHG indication associated with one of the different bordering domains is not equal to the regular SHG indication associated with another of the different bordering domains;
  d) marking ports of a specific node directly connected to two or more root points with the additional special non-SHG indication;
  using the marked ports to manage traffic of the specific E-tree service in the network according to following rules: prohibiting to forward traffic, via a specific node, between ports marked with equal SHG indications, allowing to forward traffic, via a specific node, between ports marked with different SHG indications, and allowing forward traffic, via a specific node, between the ports marked with equal additional special non-SHG indications.

2. The method according to claim 1, further comprising: deployment of the E-tree service onto the suitable E-tree structure in the MPLS network after performing the marking step, and managing traffic of the E-tree service in the network according to the rules.

3. The method according to claim 1, wherein said links being either physical connections or pseudo wires PWs of said E-tree service in the MPLS network.

4. The method according to claim 1, being performed separately for each E-tree service in the MPLS network.

5. The method according to claim 1, wherein the marking is performed by a Network Management Entity NME, and wherein the information about the marking is downloaded by the NME to the network nodes.

6. The method according to claim 1, wherein the MPLS network is a multi-domain H-VPLS network.

7. A software product comprising data and/or computer implementable instructions for carrying out the method according to claim 1, stored on an appropriate computer readable non-transitory storage medium so that the software is capable of enabling operations of said method when used in a computer system.

8. The method according to claim 1, wherein allowing forward traffic between the ports marked with the additional special indication includes enabling two root points to communicate with each other.

9. A computer system comprising a Network Management Entity (NME) suitable for managing E-tree services in an MPLS network comprising nodes,
  the NME comprising respective functional blocks configured to: store topology data of the network in the NME, wherein the topology comprising information about at least one E-tree structure for E-tree service;
  perform processing of the topology data, based on the processed topology data, select indications of at least the following types: one or more regular Split Horizon Group (SHG) indications, one special SHG indication, and one additional special non-SHG indication;
  based on the topology of the network and the specific E-tree service, mark ports of the network nodes of the E-tree structure by using all of said indications as follows:
  a) marking ports of a specific node, associated with links leading directly or indirectly only to leaf points of the structure, with said special SHG indication;
  b) marking ports of a specific node, associated with links leading directly or indirectly to the root point, with one of the regular SHG indications;
  c) marking ports of a specific node, connected to links incoming from or outgoing to one and the same domain, with one and the same regular SHG indication and associating said regular SHG indication with said domain, wherein, in case the same said specific node is a border node between different bordering domains, the regular SHG indication associated with one of the different bordering domains is not equal to the regular SHG indication associated with another of the different bordering domains;

d) marking ports of a specific node directly connected to root points with additional special non-SHG indication;

download the performed marking to the nodes, thereby commanding to the nodes to mark their ports with the selected indications and enabling the nodes to pass traffic of the specific E-tree service there-through according to following rules: prohibit forwarding the traffic, via a specific node, between ports marked with equal SHG indications, forward the traffic, via a specific node, between ports marked with different SHG indications, and forward the traffic, via a specific node, between the ports marked with equal additional special non-SHG indication.

* * * * *